(12) United States Patent
Ito et al.

(10) Patent No.: US 11,584,398 B2
(45) Date of Patent: Feb. 21, 2023

(54) VEHICLE CONTROL DEVICE, VEHICLE CONTROL METHOD, AND AUTOMATIC DRIVING PROHIBITION SYSTEM

(71) Applicant: TOYOTA JIDOSHA KABUSHIKI KAISHA, Toyota (JP)

(72) Inventors: Yuki Ito, Iwakura (JP); Tsukasa Nakanishi, Nagoya (JP); Yuta Morikawa, Miyoshi (JP); Naoki Yamamuro, Nagoya (JP); Yuki Tatsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/931,888

(22) Filed: Jul. 17, 2020

(65) Prior Publication Data

US 2021/0024099 A1 Jan. 28, 2021

(30) Foreign Application Priority Data

Jul. 23, 2019 (JP) .............................. JP2019-135664

(51) Int. Cl.
*B60W 60/00* (2020.01)
*G05D 1/00* (2006.01)
*G01C 21/34* (2006.01)

(52) U.S. Cl.
CPC ...... *B60W 60/0053* (2020.02); *B60W 60/001* (2020.02); *G01C 21/3461* (2013.01);
(Continued)

(58) Field of Classification Search
CPC ....... G05D 1/0011–005; G05D 1/0061; G05D 1/0088; G05D 1/00; G05D 1/0016;
(Continued)

(56) References Cited

U.S. PATENT DOCUMENTS

| 6,285,944 B1* | 9/2001 | Tange ................... B60W 30/16 |
| | | 180/197 |
| 2001/0004724 A1* | 6/2001 | Nagaki ................... G01C 21/32 |
| | | 701/462 |

(Continued)

FOREIGN PATENT DOCUMENTS

| JP | 2018-032433 A | 3/2018 | |
| JP | 2018032334 A | * 3/2018 | ......... B60R 16/0315 |

(Continued)

OTHER PUBLICATIONS

Radio—Wikipedia, capture of https://en.wikipedia.org/wiki/Radio, Jan. 4, 2018, via archive.org (Year: 2018).*

(Continued)

*Primary Examiner* — Jeffrey C Boomer
*Assistant Examiner* — Paul Allen
(74) *Attorney, Agent, or Firm* — Oliff PLC

(57) ABSTRACT

A vehicle control device includes: a situation detection device that detects a situation around a periphery of a vehicle and outputs a situation detection signal based on detection results; and a processor (i) that is input with the situation detection signal when the vehicle travels in an autonomous automatic driving mode, that controls travel of the vehicle based on the situation detection signal, and (ii) that enters a prohibited state that prohibits control of the travel of the vehicle in the autonomous automatic driving mode in a prohibited area in which the travel of the vehicle in the autonomous automatic driving mode is prohibited.

9 Claims, 4 Drawing Sheets

(52) U.S. Cl.
CPC ......... *G05D 1/0016* (2013.01); *G05D 1/0022* (2013.01); *B60W 2555/60* (2020.02); *B60W 2556/45* (2020.02)

(58) Field of Classification Search
CPC ................ G05D 1/0022; B60W 60/00; B60W 60/005–007; B60W 600/0053; B60W 60/001; B60W 2555/60; B60W 2556/45; G01C 21/3461
USPC .................................................. 701/2, 23–28
See application file for complete search history.

(56) References Cited

U.S. PATENT DOCUMENTS

| | | | | |
|---|---|---|---|---|
| 2015/0241878 A1* | 8/2015 | Crombez | ............. | B60W 30/12 701/23 |
| 2016/0139594 A1* | 5/2016 | Okumura | ............. | B60W 30/00 701/2 |
| 2017/0225567 A1* | 8/2017 | Tsuda | ..................... | G08G 1/015 |
| 2017/0255195 A1* | 9/2017 | Mabuchi | .............. | G05D 1/0022 |
| 2017/0259832 A1* | 9/2017 | Lathrop | ............... | G05D 1/0061 |
| 2018/0067486 A1* | 3/2018 | Yako | ..................... | G05B 19/042 |
| 2018/0095457 A1 | 4/2018 | Lee et al. | | |
| 2018/0181138 A1 | 6/2018 | Hashimoto et al. | | |
| 2018/0284759 A1 | 10/2018 | Michalakis et al. | | |
| 2019/0041850 A1* | 2/2019 | Chase | ................ | G08G 1/09675 |
| 2019/0056732 A1* | 2/2019 | Aoi | ........................ | B60W 50/14 |
| 2019/0215671 A1 | 7/2019 | Takii et al. | | |
| 2020/0047773 A1* | 2/2020 | Akaba | ....................... | G08G 1/16 |
| 2020/0327812 A1* | 10/2020 | Ran | .................. | G08G 1/096844 |
| 2020/0406914 A1* | 12/2020 | Zhang | .............. | B60W 60/0054 |
| 2022/0011768 A1* | 1/2022 | Matsunaga | .............. | G08G 1/16 |
| 2022/0126878 A1* | 4/2022 | Moustafa | .......... | B60W 60/0053 |

FOREIGN PATENT DOCUMENTS

| | | |
|---|---|---|
| JP | 2018-103667 A | 7/2018 |
| JP | 2018-184160 A | 11/2018 |
| JP | 2019-079217 A | 5/2019 |
| JP | 2019-121320 A | 7/2019 |
| WO | 2018/087828 A1 | 5/2018 |

OTHER PUBLICATIONS

Aono H—English Description of JP-2018032334-A via Espacenet Patent Translate, retrieved Feb. 10, 2022. (Year: 2022).*

* cited by examiner

VEHICLE CONTROL DEVICE, VEHICLE CONTROL METHOD, AND AUTOMATIC DRIVING PROHIBITION SYSTEM

CROSS-REFERENCE TO RELATED APPLICATION

This application is based on and claims priority under 35 USC 119 from Japanese Patent Application No. 2019-135664 filed on Jul. 23, 2019, the disclosure of which is incorporated by reference herein.

BACKGROUND

Technical Field

The present invention relates to a vehicle control device that controls the running of a vehicle, a vehicle control method, and an automatic driving prohibition system that prohibits automatic driving of a vehicle from outside the vehicle.

Related Art

For example, Japanese Patent Application Laid-Open No. 2018-103667 discloses an example of an automatic driving system for a vehicle. In such an automatic driving system, autonomous automatic driving of a vehicle that does not depend on a driving control operation by an occupant of the vehicle is possible. By the way, in the state where the traveling of the vehicle is controlled by the autonomous automatic driving, the responsibility for the traveling control of the vehicle is ambiguous, and there are places (areas) where it is desirable to clarify the responsibility for the traveling control of the vehicle.

SUMMARY

The present invention has been made in view of the above circumstances, and aims to provide a vehicle control device and an automatic driving prohibition system that can suppress ambiguity of responsibility for vehicle driving control.

A vehicle control device of a first aspect of the present invention includes: a situation detection device that detects a situation around a periphery of a vehicle and outputs a situation detection signal based on detection results; and a processor that is input with the situation detection signal when the vehicle travels in an autonomous automatic driving mode to control travel of the vehicle based on the situation detection signal, and that enters a prohibited state that prohibits control of the travel of the vehicle in the autonomous automatic driving mode in a prohibited area in which the travel of the vehicle in the autonomous automatic driving mode is prohibited.

According to the vehicle control device of the first aspect of the present invention, the situation around the vehicle is detected by the situation detection device. The situation detection device outputs a situation detection signal based on the detection results of the situation detection device. In the autonomous automatic driving mode, the situation detection signal output from the situation detection device is input to the processor. The processor controls the travel of the vehicle based on the situation detection signal. Thereby, the travel of the vehicle is controlled without depending on operation of an operating device operated by the occupant of the vehicle.

Further, in a prohibited area in which travel of the vehicle in the autonomous automatic driving mode is prohibited, control of the travel of the vehicle in the autonomous automatic driving mode is prohibited by the processor. Therefore, in the above-described prohibited area, the travel of the vehicle is controlled in a different mode from the autonomous automatic driving mode.

The vehicle control device according to a second aspect of the present invention is the vehicle control device according to the first aspect, including an operation device that is provided in the vehicle, that is configured to be operated by an occupant of the vehicle, and that is configured to control the travel of the vehicle by being operated when the vehicle travels in a manual mode, which is a travel operation control mode that is different from the autonomous automatic driving mode, in which the processor permits control of the travel of the vehicle in the manual mode in the prohibited area.

According to the vehicle control device of the second aspect of the present invention, the vehicle is provided with the operation device. In the manual mode, which is a travel operation control mode that is different from the autonomous automatic driving mode, when the operation device is operated by the occupant of the vehicle, it is possible to control the travel of the vehicle based on the operation of the operation device.

Here, in the prohibited area in which control of the travel of the vehicle in the autonomous automatic driving mode is prohibited, the processor allows control of the travel of the vehicle in the manual mode. Therefore, the travel of the vehicle can be controlled in the prohibited area based on operation of the operating device by the occupant of the vehicle.

A vehicle control device of a third aspect of the present invention is the vehicle control device of the first or second aspect, including a remote control signal reception unit that is configured to receive a remote control signal based on operation by an operator external to the vehicle, in which the processor controls the travel of the vehicle based on the remote control signal received by the remote control signal reception unit in a remote control mode, which is a travel operation control mode that is different from the autonomous automatic driving mode, and permits control of the travel of the vehicle in the remote control mode in the prohibited area.

According to the vehicle control device of the third aspect of the present invention, travel control of the vehicle can be performed in a remote control mode that is a travel operation control mode that is different from the autonomous automatic driving mode. In the remote control mode, when a remote control signal based on operation by an operator outside the vehicle is received by the remote control signal reception unit, the processor controls the traveling of the vehicle based on the remote control signal. Therefore, the vehicle is remotely operated by an operator outside the vehicle.

Here, the processor permits control of the travel of the vehicle in the remote control mode in the area in which autonomous automatic driving is prohibited. Therefore, in the area in which autonomous automatic driving is prohibited, travel of the vehicle can be controlled based on operation of the operation device by an operator at a control center.

A vehicle control device of a fourth aspect of the present invention is the vehicle control device of the second or third aspect, in which the processor is configured to be input with a prohibition signal that is output from outside the vehicle as a result of the vehicle entering a reception enabled range including the prohibited area, and to enter the prohibited state as a result of being input with the prohibition signal.

According to the vehicle control device of the fourth aspect of the present invention, when a vehicle enters a reception enabled range including a prohibited area in which travel control of the vehicle in the autonomous automatic driving mode is prohibited, a prohibition signal output from outside the vehicle can be input to the processor. When the prohibition signal is input to the processor, the processor enters the prohibited state, and vehicle travel control in the autonomous automatic driving mode is prohibited.

The vehicle control device of a fifth aspect of the present invention is the vehicle control device of the fourth aspect, wherein the processor is configured to switch from the autonomous automatic driving mode to the manual mode or the remote control mode and control travel of the vehicle as a result of the processor being input with the prohibition signal.

According to the vehicle control device of the fifth aspect of the present invention, when a vehicle enters a reception enabled range including a prohibited area in which travel control of the vehicle in the autonomous automatic driving mode is prohibited, and the prohibition signal is input to the processor, the processor switches the mode of travel control of the vehicle from the autonomous automatic driving mode to the manual mode or the remote control mode.

An automatic driving prohibition system of a sixth aspect of the present invention includes: a prohibition signal transmission device that is installed in an prohibited area externally to a vehicle and that is configured to output a prohibition signal; and a vehicle control device that is provided at the vehicle, and that is configured to control travel of the vehicle in an autonomous automatic driving mode that controls the travel of the vehicle based on detection results of a situation around a periphery of the vehicle obtained by a situation detection device and to prohibit control of the travel of the vehicle in the autonomous automatic driving mode in a prohibited area as a result of receiving the prohibition signal.

According to the automatic driving prohibition system of the sixth aspect of the present invention, a vehicle is provided with a vehicle control device. The vehicle control device is configured to control travel of the vehicle in an autonomous automatic driving mode. In the autonomous automatic driving mode, the situation around a vehicle is detected by a situation detection device, and the vehicle control device controls the travel of the vehicle based on detection results from the situation detection device. Therefore, in the autonomous automatic driving mode, the travel of the vehicle is controlled without depending on operation of an operation device by the occupant of the vehicle.

Further, a prohibition signal transmission device is installed in a prohibited area outside the vehicle. A prohibition signal is transmitted from the prohibition signal transmission device. When the prohibition signal is received by the vehicle control device at the vehicle side, control of the travel of the vehicle in the autonomous automatic driving mode is prohibited by the vehicle control device. Therefore, in the above-described prohibited area, the travel of the vehicle is controlled in a different mode from the autonomous automatic driving mode.

As described above, in the vehicle control device of the first aspect of the present invention, in the prohibited area, control of travel of the vehicle in the autonomous automatic driving mode is prohibited by the processor. For this reason, it is possible to prevent ambiguity in the designation of responsibility for vehicle travel.

In the vehicle control device of the second aspect of the present invention, by controlling vehicle travel in the manual mode in the area in which vehicle travel in the autonomous automatic driving mode is prohibited, responsibility for vehicle travels falls to the vehicle occupant operating the operation device. As a result, responsibility can be clarified.

In the vehicle control device of the third aspect of the present invention, by controlling vehicle travel in the remote control mode in the area in which vehicle travel in the autonomous automatic driving mode is prohibited, responsibility for vehicle travels falls to the operator operating the vehicle remotely at a control center. As a result, responsibility can be clarified.

In the vehicle control device of the fourth aspect of the present invention, control of travel of the vehicle in the autonomous automatic driving mode is put into a prohibited state by the control unit, by the vehicle entering the reception enabled range including the prohibited area and the processor being input with the prohibition signal. For this reason, control of at least vehicle travel in the autonomous automatic driving mode in the prohibited area can be prohibited.

In the vehicle control device of the fifth aspect of the present invention, vehicle travel can be controlled in the manual mode or the remote control mode due to the vehicle entering the reception enabled range including the prohibited area.

In the automatic driving prohibition system of the sixth aspect of the present invention, in the prohibited area, vehicle travel control in the autonomous automatic driving mode is prohibited by the vehicle control device. For this reason, it is possible to prevent ambiguity in the designation of responsibility for vehicle travel.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described based on FIG. 1 through FIG. 4.
<Structure of Present Embodiment>

Figure 1:
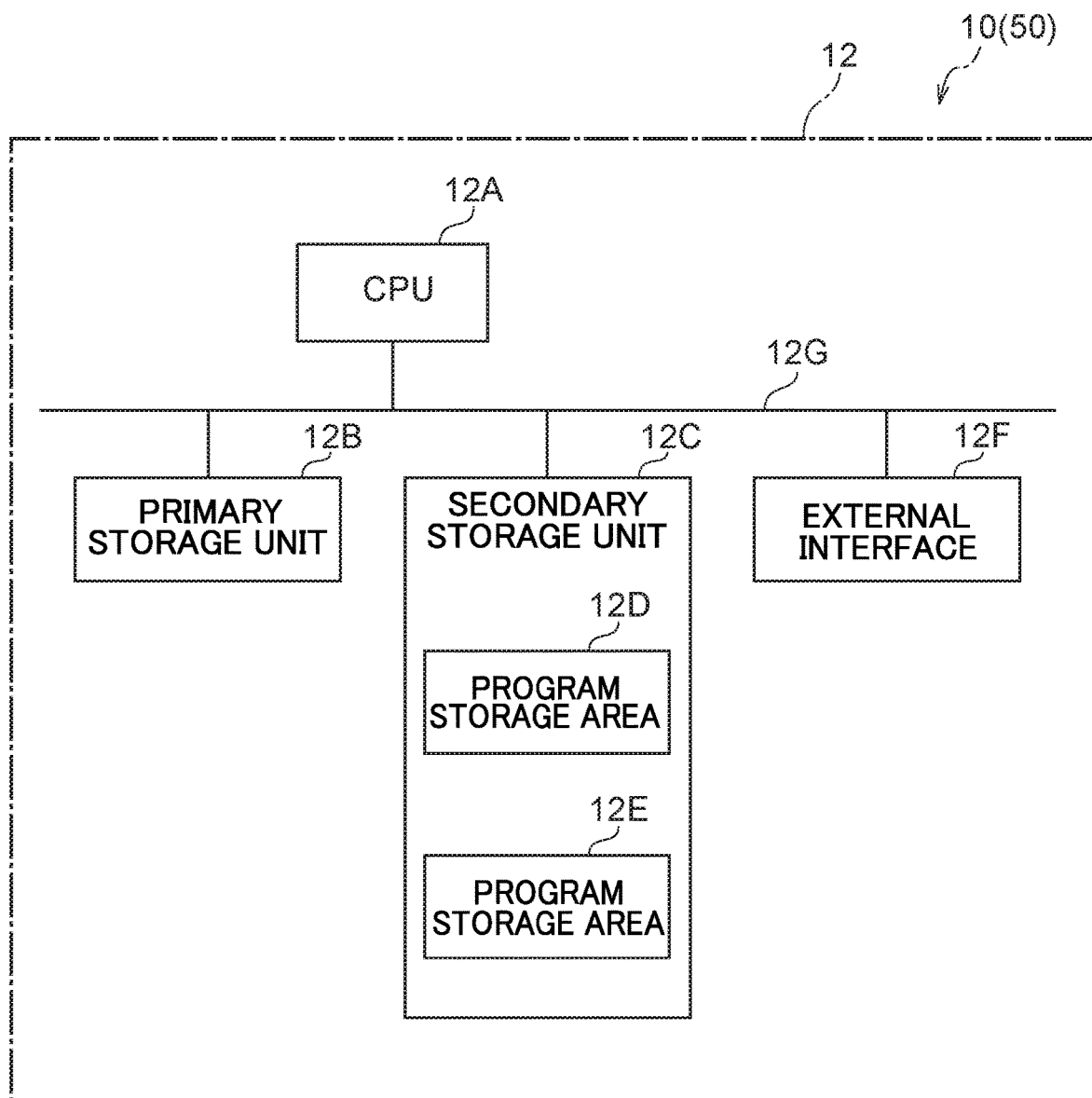
FIG. 1 is a block diagram of a vehicle control device according to one embodiment of the present invention.

As shown in FIG. 1, the present vehicle control device 10 includes a control unit 12. The control unit 12 includes a CPU (Central Processing Unit) 12A, which is an example of a processor that is hardware, a primary storage unit 12B, a secondary storage unit 12C, and an external interface 12F. The CPU 12A, the primary storage unit 12B, the secondary storage unit 12C, and the external interface 12F are interconnected via a bus 12G. The CPU 12A, the primary storage unit 12B, the secondary storage unit 12C, and the external interface 12F may be included in an ECU (Engine Control Unit).

The primary storage unit 12B is configured by a volatile memory such as a RAM (Random Access Memory). The secondary storage unit 12C is configured by a nonvolatile memory such as a ROM (Read Only Memory), an HDD (Hard Disk Drive), or an SSD (Solid State Drive).

The secondary storage unit 12C includes a program storage area 12D and a data storage area 12E. The program storage area 12D stores, for example, a program such as an in-vehicle status notification program for causing the CPU 12A to execute an autonomous automatic driving traveling control process, a remote control traveling control process, an autonomous automatic driving traveling inhibiting process, and the like. Various programs stored in the program storage area 12D of the secondary storage unit 12C are read out by the CPU 12A, opened in the primary storage unit 12B, and executed.

Various external devices to be described later are connected to the external interface 12F. Various external devices are connected to the CPU 12A via the external interface 12F, and electrical signals output from the various external devices are input to the CPU 12A via the external interface 12F and processed. The intermediate data and the like generated by the CPU 12A processing the electrical signals output from various external devices in this manner are stored in the data storage area 12E of the secondary storage unit 12C described above.

Figure 2:
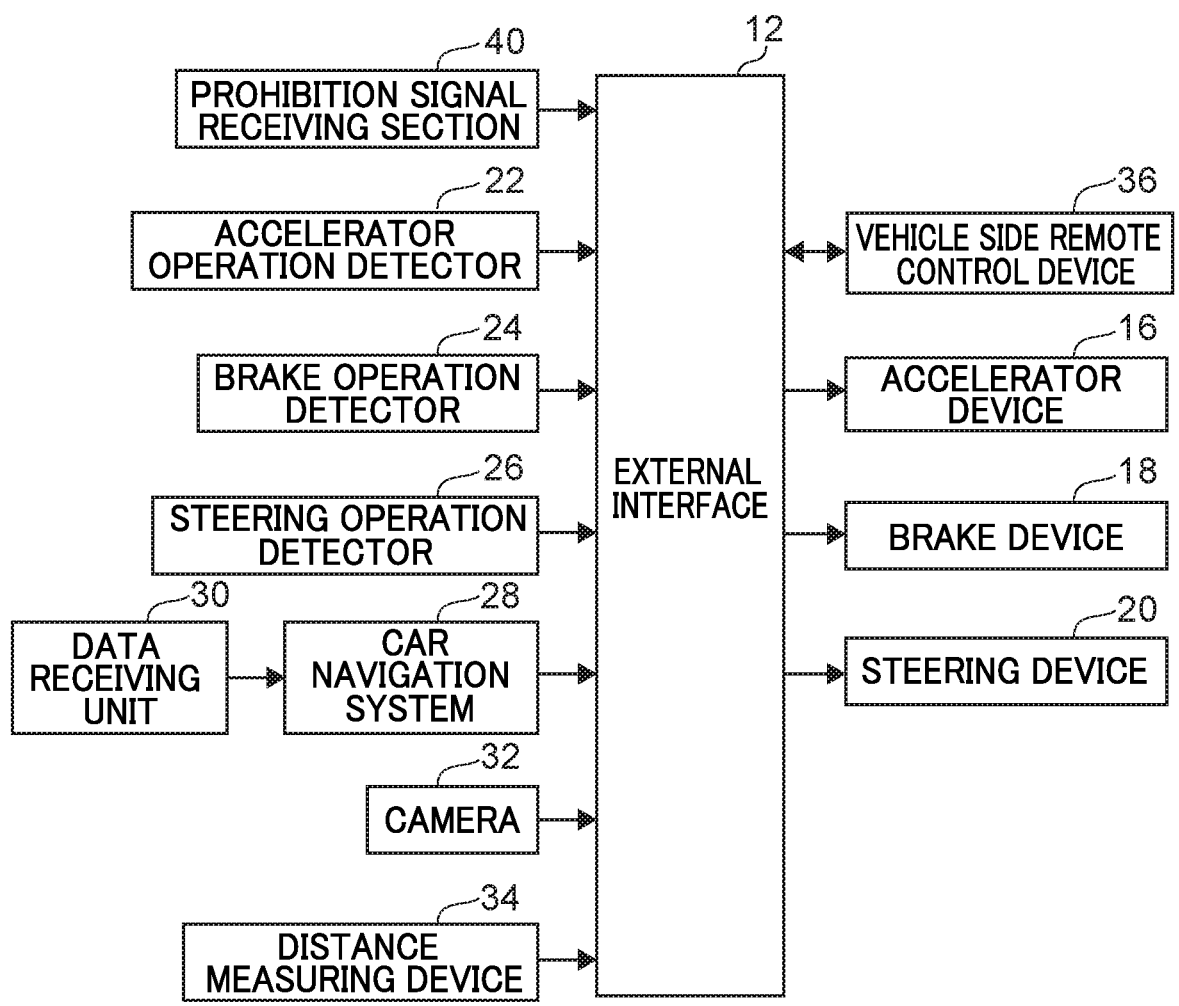
FIG. 2 is a block diagram showing an external device connected to an external interface.
Figure 3:
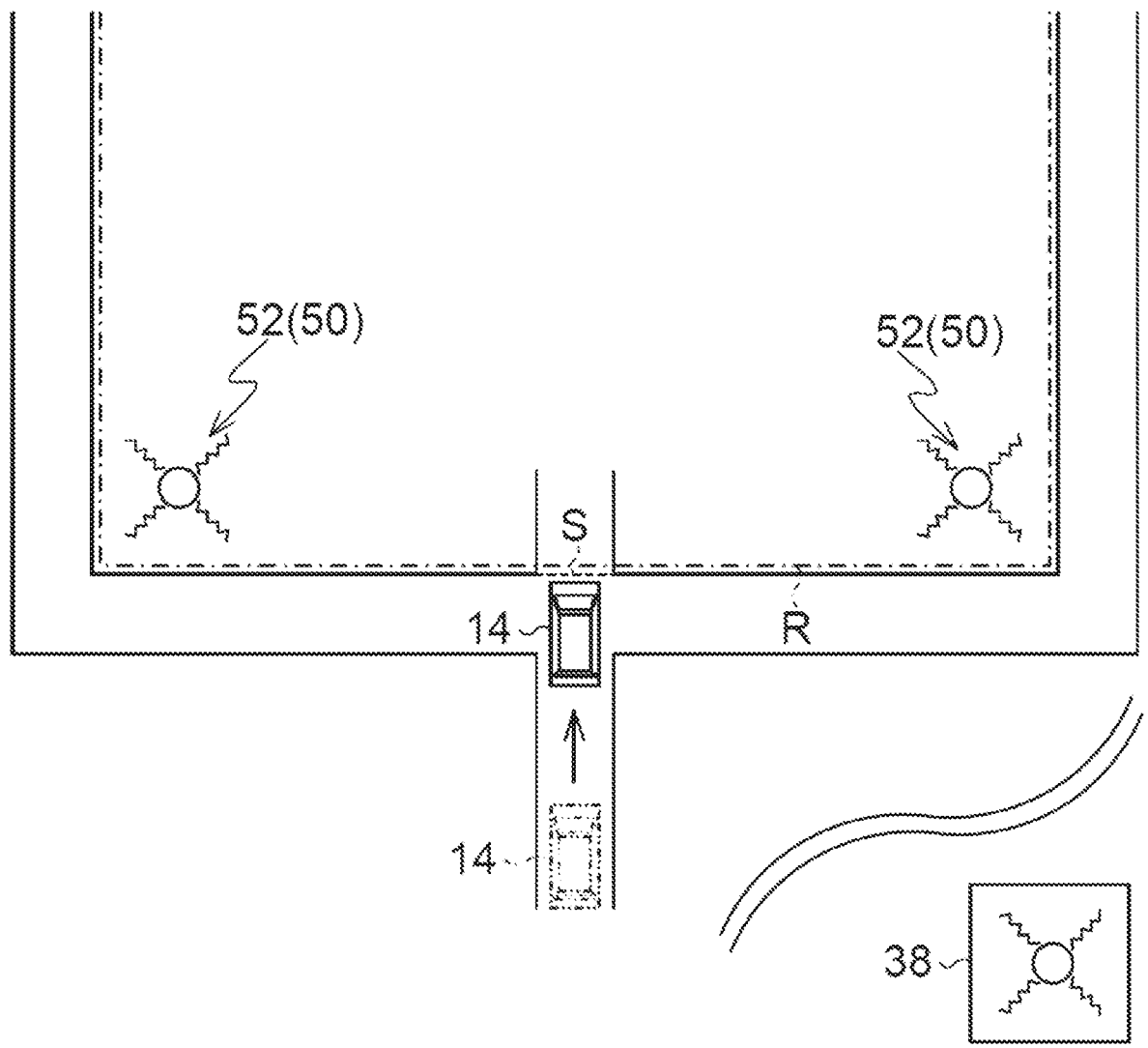
FIG. 3 is a schematic plan view of the vicinity of the prohibited area viewed from above.

As shown in FIG. 2, an external interface 12F of the control unit 12 is electrically connected to traveling operation devices such as an accelerator device 16, a brake device 18, and a steering device 20 of the vehicle 14. Vehicle 14 is shown in FIG. 3.

When the vehicle 14 is an electric vehicle or the like that uses electric power as driving energy, the accelerator device 16 is electrically connected to a driving motor mounted on the vehicle 14. The driving motor is mechanically connected to driving wheels of the vehicle 14. The accelerator device 16 controls the power supplied to the drive motor based on the signal level of the accelerator control signal output from the CPU 12A of the control unit 12. Here, the CPU 12A is shown in FIG. 1. Accordingly, the rotation of the drive wheels of the vehicle 14 is controlled based on the signal level of the above-described accelerator control signal, and the vehicle 14 travels at a speed and with an acceleration based on the signal level of the accelerator control signal.

On the other hand, if the vehicle 14 is an engine vehicle using gasoline or the like as a fuel, the accelerator device 16 is electrically connected to a drive unit that operates a throttle valve that adjusts the amount of air flowing into the engine. The drive unit drives the throttle valve based on the signal level of the accelerator control signal. As a result, the vehicle 14 runs at a speed and with an acceleration based on the signal level of the accelerator control signal.

On the other hand, the brake device 18 includes a brake drive unit that is driven by being supplied with power. The brake drive unit is configured by, for example, an electric motor, and the drive direction and the drive speed of the brake drive unit are controlled based on the signal level of the brake control signal output from the CPU 12A of the control unit 12. When the brake drive unit is driven to rotate forward, the brake pads and the brake shoes of the mechanical brake system constituting the vehicle 14 are pressed against the wheels of the vehicle 14. Thereby, the rotation speed of the wheels is reduced. On the other hand, when the brake drive unit is driven in the reverse direction, the pressing of the brake pads and the brake shoes against the wheels is weakened. As a result, the reduction of the rotational speed of the wheel is reduced, or the further reduction of the wheel speed is eliminated.

Further, the steering device 20 includes a steering drive unit that is driven by being supplied with power. The steering drive unit is configured by, for example, an electric motor or the like. The driving direction and the driving speed of the steering drive unit are controlled based on the signal level of the steering control signal output from the CPU 12A of the control unit 12.

The steering drive unit is mechanically connected to a kingpin that supports at least either the front wheels or the rear wheels of the vehicle 14 via a mechanical transmission mechanism such as a rack, a pinion, or a tie rod. When the steering drive unit is driven, the driving force output from the steering drive unit is transmitted to the kingpin via the mechanical transmission mechanism. As a result, the front wheels of the vehicle 14 are rotated in a direction around an axis whose axial direction is the vehicle vertical direction, and the traveling direction of the vehicle 14 is changed.

The vehicle 14 has an accelerator pedal. The accelerator pedal is provided on the lower side in front of the driver's seat in the cabin of the vehicle 14 so as to be rotatable around an axis whose axial direction is the vehicle width direction. When the pedal portion of the accelerator pedal is stepped on by the occupant seated in the driver's seat of the vehicle 14, the pedal portion of the accelerator pedal is turned downward in accordance with the magnitude of the pedaling force from the occupant. The rotation angle and rotation speed of the accelerator pedal are detected by a sensor included in the accelerator operation detector 22 shown in FIG. 2.

The accelerator operation detector 22 outputs an accelerator operation signal at a level corresponding to the sizes of each of the rotation angle and the rotation speed of the accelerator pedal. The accelerator operation signal output from the accelerator operation detector 22 is input to the CPU 12A via the external interface 12F of the control unit 12. When the traveling control mode of the vehicle 14 is in the manual mode, the CPU 12A of the control unit 12 generates and outputs an accelerator control signal corresponding to the level of the accelerator operation signal input to the CPU 12A. Therefore, in the state of the manual mode, for example, the traveling speed and the acceleration of the vehicle 14 are set according to the turning angle and the turning speed of the accelerator pedal depressed by the occupant. Here, the acceleration includes the deceleration.

Further, the vehicle 14 includes a brake pedal. The brake pedal is provided on the lower side in front of the driver's seat in the cabin of the vehicle 14 so as to be rotatable around an axis whose axial direction is the vehicle width direction. When the pedal portion of the brake pedal is stepped on by the occupant seated in the driver's seat of the vehicle 14, the pedal portion of the brake pedal is turned forward and upward in accordance with the magnitude of the pedaling force from the occupant. The rotation angle and rotation speed of the brake pedal are detected by a sensor included in the brake operation detector 24 shown in FIG. 2.

The brake operation detector 24 outputs a brake operation signal at a level corresponding to the sizes of each of the rotation angle and the rotation speed of the brake pedal. The brake operation signal output from the brake operation detector 24 is input to the CPU 12A via the external interface 12F of the control unit 12. When the traveling control mode of the vehicle 14 is in the manual mode, the CPU 12A of the control unit 12 generates and outputs a brake control signal corresponding to the level of the brake operation signal input to the CPU 12A. Therefore, in the state of the manual mode, the vehicle 14 is decelerated according to, for example, the turning angle and the turning speed of the brake pedal depressed by the occupant.

Further, the vehicle 14 includes a steering wheel. The steering wheel is provided so as to be rotatable left and right in an axial direction with the vehicle front-rear direction as the axial direction at the front side of the driver's seat in the cabin of the vehicle 14, and rotary operation of the steering wheel by the occupant of the drivers seat of the vehicle 14 is enabled. The rotation angle of the steering wheel is detected by a sensor included in the steering operation detector 26 shown in FIG. 2.

The steering operation detector 26 outputs a steering operation signal at a level corresponding to the rotation angle of the steering wheel. The steering operation signal output from the steering operation detector 26 is input to the CPU 12A via the external interface 12F of the control unit 12. When the traveling control mode of the vehicle 14 is in the manual mode, the CPU 12A of the control unit 12 generates and outputs a steering control signal corresponding to the level of the steering operation signal input to the CPU 12A. Therefore, in the state of the manual mode, the vehicle 14 is steered according to the rotation angle of the steering wheel rotated by the occupant, for example.

On the other hand, an external interface 12F of the control unit 12 is electrically connected to a car navigation system 28 as a destination input unit and a positioning signal receiving unit. The CPU 12A of the control unit 12 can access a control unit of a car navigation system 28 different from the control unit 12. Therefore, the CPU 12A of the control unit 12 can read information read by the control unit of the car navigation system 28 and information stored in the car navigation system 28.

The car navigation system 28 includes an antenna, and a positioning signal output from an artificial satellite or the like constituting a positioning system is received by the antenna of the car navigation system 28. Here, the positioning signal is output as a radio wave. The car navigation system 28 calculates the latitude and longitude of the current position by receiving the positioning signal, and can display the current position of the vehicle 14 on a map displayed on a monitor in the cabin of the vehicle 14. The car navigation system 28 includes an input device, and can search and set, for example, a route from a departure place to a destination by operation of the input device by an occupant. Further, the car navigation system 28 is electrically connected to a data receiving unit 30 which is one mode of a situation detecting device.

The data receiving unit 30 includes an antenna capable of receiving a data signal, and can receive a data signal transmitted from a service organization. For example, data signals such as road information and weather information on the departure point, the destination, and the route to the destination are transmitted from the service organization. Here, the road information includes, for example, road speed limit and traffic congestion information. When the data signal is input to the data receiving unit 30, the data signal is input to the control unit of the car navigation system 28. Further, the data signal is input to the control unit 12 via the car navigation system 28.

Further, an external interface 12F of the control unit 12 is electrically connected to a camera 32 as a vehicle periphery image pickup device that constitutes a vehicle periphery monitoring device as one mode of the situation detection device. The camera 32 captures images of the periphery of the vehicle 14. Here, the periphery of the vehicle 14 is, for example, the front of the vehicle 14. The video or image captured by the camera 32 is converted into an image information signal and input to the CPU 12A of the control unit 12 via the external interface 12F. Based on the input image information signal, the CPU 12A of the control unit 12 analyzes a situation around the vehicle 14 such as a road width in front of the vehicle 14, a change in a traffic light, or a state of another vehicle or a pedestrian in front of the vehicle 14.

Further, an external interface 12F of the control unit 12 is electrically connected to a distance measuring device 34 that constitutes a vehicle periphery monitoring device as one mode of the situation detection device together with the camera 32. The distance measuring device 34 includes a detection wave output unit and a detection wave reception unit. A detection wave is output from the detection wave output unit of the distance measuring device 34 to the front of the vehicle 14 or the like. The detection wave is, for example, an electromagnetic wave such as infrared light or laser light, and is reflected by an obstacle or the like in front of the vehicle 14. When the reflected wave of the detection wave is received by the detection wave receiving unit of the distance measuring device 34, the distance measuring device 34 calculates the distance from the vehicle 14 to an obstacle or the like. A forward monitoring signal based on the calculation result is output from the distance measuring device 34. The forward monitoring signal output from the distance measuring device 34 is input to the CPU 12A of the control unit 12 via the external interface 12F.

The vehicle 14 on which the present vehicle control device 10 is mounted is capable of performing an autonomous driving operation in an autonomous automatic driving mode which is one mode of the driving control mode. In the state of the autonomous automatic driving mode, the accelerator operation signal, the brake operation signal, the steering operation signal, and the like are appropriately output from the CPU 12A of the control unit 12 based on the signals output from the car navigation system 28, the camera 32, the distance measuring device 34, and the like. Thereby, the traveling of the vehicle 14 is controlled without depending on the operation of the occupant of the vehicle 14, and the vehicle 14 can travel toward the destination or the like without particularly requiring the operation of the occupant.

The external interface 12F of the control unit 12 is electrically connected to a vehicle-side remote control device 36 as a remote control signal receiving unit. The vehicle-side remote control device 36 can communicate back and forth with a control center 38 shown in FIG. 3. The control center 38 is set in various places to control a specific area such as a sightseeing spot, a residential area, and a multistory parking lot, for example. The control center 38 is provided with a monitor. In the mutual communication state between the vehicle 14 and the control center 38, a video signal based on the video captured by the camera 32 described above is output as radio waves from the vehicle-side remote control device 36 via the control unit 12. When the control center 38 receives the video signal output from the vehicle-side remote control device 36, an image based on the video signal is displayed on a monitor of the control center 38.

Further, a controller is installed in the control center 38. When the vehicle 14 and the control center 38 communicate with each other, a remote control signal based on the operation of the controller of the control center 38 is output from the control center 38. When the remote control signal output from the control center 38 is received by the vehicle-side remote control device 36 of the vehicle 14, the remote control signal is input to the CPU 12A via the external interface 12F of the control unit 12. When the remote control signal is input to the CPU 12A, the CPU 12A generates an accelerator operation signal, a brake operation signal, a steering operation signal, and the like based on the remote control signal, and outputs the signal from the CPU 12A. Thus, the vehicle 14 is remotely controlled based on the operation of the controller by the operator of the control center 38. This is a remote control mode which is one mode of the travel control mode.

On the other hand, the present vehicle control device 10 includes a prohibition signal receiving unit 40. The prohibition signal receiving unit 40 includes an antenna, and the antenna of the prohibition signal receiving unit 40 can receive a prohibition signal that is a radio wave. The prohibition signal is output from the transmission antenna of the prohibition signal transmission device 52 shown in FIG. 3. The prohibition signal transmission device 52 configures the automatic driving prohibition system 50 together with the vehicle control device 10 as a prohibition signal transmission device.

One or more of the prohibition signal transmission devices 52 is installed in a prohibited area 52 such as a region of a predetermined range including buildings having predetermined confidentiality such as factories or research laboratories of a company, educational facilities such as a school, a kindergarten, or a nursery school, or a building or a facility such as a welfare facility such as a hospital, of a predetermined range including a place where the probability of occurrence of a traffic accident is statistically high, or an area where the population density is equal to or higher than a predetermined value. The reception range of the prohibition signal is set to the inside of the prohibited area 52 and the vicinity of the prohibited area 52 outside the prohibited area 52. Therefore, when the vehicle 14 approaches the prohibited area 52, the prohibition signal is received by the antenna of the prohibition signal receiving unit 40 of the vehicle 14.

When the prohibition signal is received by the antenna of the prohibition signal receiving unit 40, the prohibition signal is input to the CPU 12A (see FIG. 1) via the prohibition signal receiving unit 40 and the external interface 12F of the control unit 12. When the prohibition signal is input to the CPU 12A while the traveling of the vehicle 14 is controlled in the autonomous automatic driving mode, the control of the traveling of the vehicle 14 in the autonomous automatic driving mode is stopped by the CPU 12A.

<Action and Effects of Present Embodiment>

Figure 4:
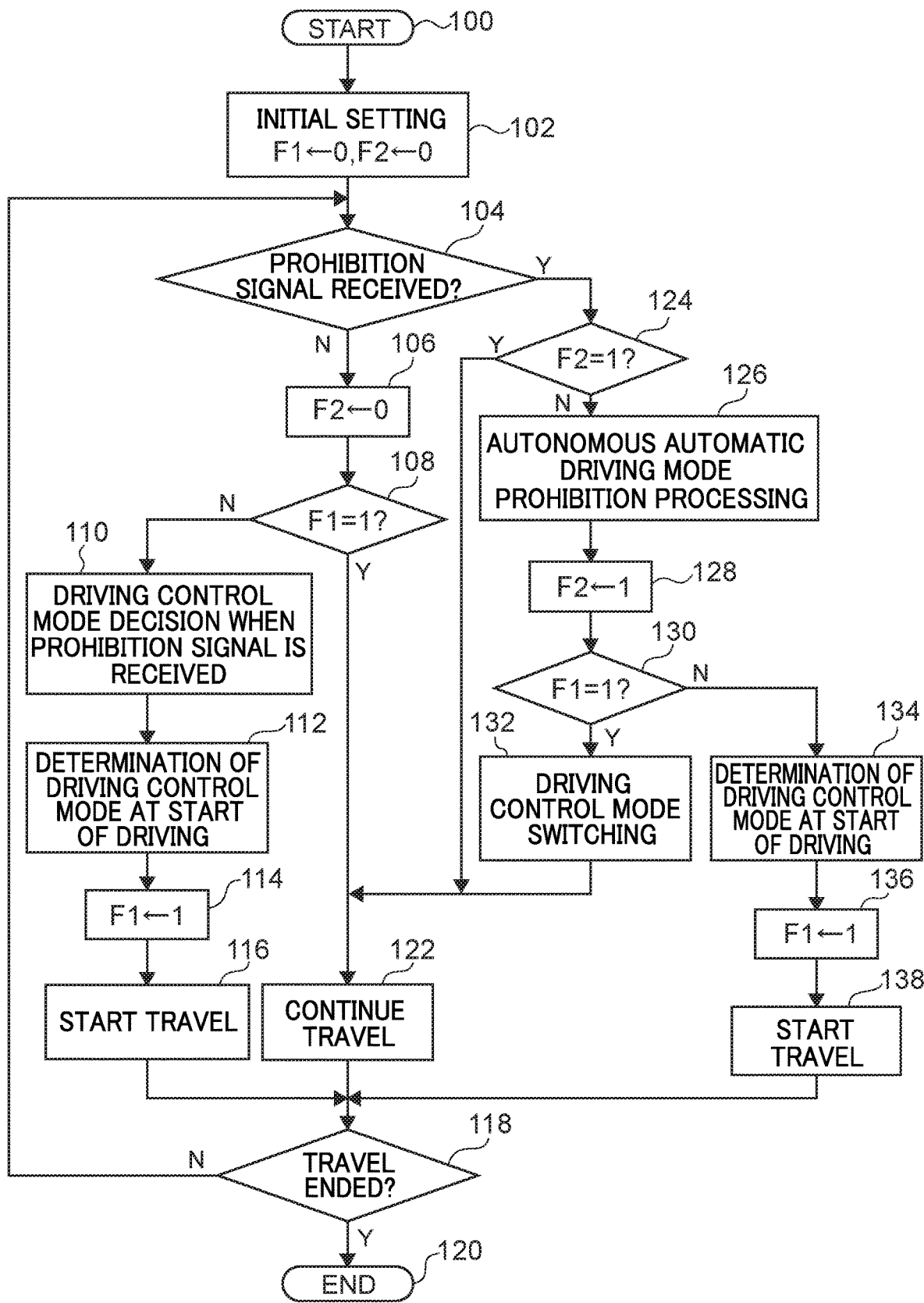
FIG. 4 is a flowchart showing an outline of control such as switching of the travel control mode in the processor.

Next, the operation and effect of the present embodiment will be described based on FIG. 4. FIG. 4 is a flowchart relating to a control program for selecting and switching the control mode of traveling of the vehicle by the control unit 12.

When the ignition device of the vehicle 14 is operated and, for example, the accessory power supply of the vehicle 14 is turned on, the above-described control program is read from the secondary storage unit 12C by the CPU 12A of the control unit 12, and is opened in the primary storage unit 12B, and executed. When the control by the control unit 12 is started in step 100 in FIG. 4, then, in step 102, an initialization process is performed, and the flag F1 and the flag F2 are reset. That is, 0 is assigned to each of the flag F1 and the flag F2. Next, in this state, it is determined whether or not the prohibition signal output from the prohibition signal transmitting device 52 is received by the prohibition signal receiving unit 40 of the present vehicle control device 10.

In this state, if the vehicle 14 is out of the reception range of the prohibition signal, for example, in the home parking lot of the occupant of the vehicle 14, the flag F2 is reset in step 106. That is, 0 is substituted for the flag F2. Next, at step 108, it is determined whether or not 1 is substituted for the flag F1. If the flag F1 remains reset immediately after the operation of the ignition device of the vehicle 14, the traveling control mode of the vehicle for when the prohibition signal receiving unit 40 receives the prohibition signal in step 110, that is, the manual mode or the remote control mode is selected by the occupant of the vehicle 14. Further, in step 112, the traveling control mode at the time of starting traveling of the vehicle 14, that is, one of the manual mode, the remote control mode, and the autonomous automatic driving mode is selected by the occupant of the vehicle 14.

Next, at step 114, 1 is substituted for the flag F1, and at step 116, the traveling of the vehicle 14 is started. Next, for example, it is determined in step 118 whether or not the traveling of the vehicle 14 has been completed by operating the ignition device of the vehicle 14. If the traveling of the vehicle 14 has been completed, the control by the control unit 12 ends in step 120. On the other hand, if the traveling of the vehicle 14 is continuing, the process returns to step 104. In this state, if the prohibition signal has not been received by the prohibition signal receiving unit 40, the process proceeds to step 108. In this state, since 1 is assigned to the flag F1, the process proceeds to step 122, and the traveling of the vehicle 14 is continued in the traveling control mode in this state.

In this state, when, for example, the occupant selects the autonomous automatic driving mode as the traveling control mode of the vehicle 14, based, for example, on the road information and the weather information received by the data receiving unit 30, the image around the vehicle 14 captured by the camera 32, and the distance from the vehicle 14 to an obstacle or the like measured by the distance measuring device 34, an accelerator operation signal, a brake operation signal, and a steering operation signal are appropriately output from the control unit 12. Therefore, in this state, the vehicle 14 can travel basically without depending on the operation of the occupant.

On the other hand, in this state, when, for example, the vehicle 14 approaches the prohibited area 52 in which the control of the traveling of the vehicle 14 in the autonomous automatic driving mode is prohibited, when, for example, the vehicle 14 arrives at the stop line S before the entrance to the prohibited area 52 in FIG. 3, the prohibition signal transmitted from the transmission antenna of the prohibition signal transmission device 52 is received by the antenna of the prohibition signal receiving unit 40 of the vehicle 14, and the prohibition signal is input to the control unit 12 via the prohibition signal receiving unit 40.

As a result, when the process proceeds from step 104 to step 124, it is determined in step 124 whether or not 1 is substituted for the flag F2. When the flag F2 is reset, the control of the traveling of the vehicle 14 in the autonomous automatic driving mode by the control unit 12 is prohibited. Next, at step 128, 1 is substituted for the flag F2. A state in which 1 is assigned to the flag F2 is a prohibited state. In this prohibited state, traveling control of the vehicle 14 in the autonomous automatic driving mode is prohibited. Therefore, in this state, for example, the occupant of the vehicle 14 cannot switch from the manual mode or the remote control mode to the autonomous automatic driving mode.

Next, at step 130, it is determined whether or not 1 is substituted for the flag F1. When the vehicle 14 enters the reception range from the outside of the reception range of the prohibition signal in the running state, 1 is already assigned to the flag F1, and the process proceeds to step 132. In step 132, the mode is switched to a driving control mode other than the autonomous automatic driving mode preset in step 110. If the traveling control mode set in step 110 is the same as the current traveling control mode, the traveling control mode is continued.

When the mode is switched to the manual mode in step 132, an accelerator operation signal, a brake operation signal, and a steering operation signal based on the accelerator operation, the brake operation, and the steering operation by the occupant of the vehicle 14 are input to the control unit 12. The control unit 12 outputs an accelerator operation signal, a brake operation signal, an accelerator control signal based on the steering operation signal, the brake control signal, and the steering control signal input to the control unit 12. Each of the accelerator device 16, the brake device 18, and the steering device 20 of the vehicle 14 is operated based on an accelerator control signal, a brake control signal, and a steering control signal output from the control unit 12. Therefore, in the manual mode, the vehicle 14 is controlled according to the operation of the occupant of the vehicle 14. That is, in this state, the occupant of the vehicle 14 has the authority to control the traveling of the vehicle 14, and the occupant of the vehicle 14 is responsible for the traveling control of the vehicle 14.

On the other hand, when the mode is switched to the remote control mode in step 132, the vehicle 14 and the control center 38 enter a mutual communication state, and the authority to control the traveling of the vehicle 14 is transferred to the operator of the control center 38. In this state, the controller installed in the control center 38 is operated by the operator of the control center 38 based on the image captured by the camera 32 of the vehicle 14 and the like. The remote control signal based on the operation of the controller of the control center 38 is output from the control center 38. The remote control signal output from the control center 38 is received by the vehicle-side remote control device 36 of the vehicle 14. Further, when a remote control signal is input to the control unit 12, an accelerator operation signal, a brake operation signal, a steering operation signal, and the like based on the remote control signal are output from the control unit 12.

Thus, the vehicle 14 is remotely controlled based on the operation of the controller by the operator of the control center 38. In this state, as described above, the authority to control the traveling of the vehicle 14 has been transferred to the operator of the control center 38. Therefore, the operator of the control center 38 is responsible for the traveling control of the vehicle 14.

On the other hand, when the traveling of the vehicle 14 is started in the prohibited area R, the traveling control mode at the time of starting traveling is determined in step 134 via from step 100 to step 104, step 124, and step 130. However, in the course of proceeding from step 100 to step 134, a prohibition process of the traveling control of the vehicle 14 in the autonomous automatic driving mode is performed in step 126, and 1 is substituted for the flag F2 in step 128 to enter the above-described prohibited state. For this reason, the travel control of the vehicle 14 in the autonomous automatic driving mode is prohibited, and further, the occupant of the vehicle 14 cannot select the autonomous automatic driving mode. Next, at step 136, 1 is substituted for the flag F1, and at step 138, the traveling is started.

When the vehicle 14 goes out of the "prohibited area R" and comes out of the reception range of the prohibition signal, the flag F2 is reset when proceeding from step 104 to step 106. As a result, the prohibition state is released, and the traveling of the vehicle 14 can be controlled in the autonomous automatic driving mode. Therefore, in this state, when, for example, the autonomous automatic driving mode is selected by the occupant of the vehicle 14, it is possible to switch from the manual mode or the remote control mode to the autonomous automatic driving mode.

As described above, in the present embodiment, in the prohibited area R, the traveling of the vehicle 14 is controlled in the manual mode or in the remote control mode. Therefore, if the running of the vehicle 14 is controlled in the manual mode, the occupant of the vehicle 14 is responsible for the traveling control of the vehicle 14. On the other hand, if the traveling of the vehicle 14 is controlled in the remote control mode, the operator of the control center 38 is responsible for the traveling control of the vehicle 14. In this way, the designation of responsibility for the traveling control of the vehicle 14 in the prohibited area R can be clarified.

In the present embodiment, in the prohibited area R, the traveling of the vehicle 14 is controlled in the manual mode or in the remote control mode. However, the configuration may be such that the control of the traveling of the vehicle 14 in the remote control mode as well as in the autonomous automatic driving mode is prohibited in the prohibited area R.

Further, in the present embodiment, the configuration is such that when the prohibition signal is input to the control unit 12, the control unit 12 stops the control of the vehicle 14 in the autonomous automatic driving mode and shifts from the autonomous automatic driving mode to the manual driving mode or the remote control mode. However, the configuration may be such that when the prohibition signal is input to the control unit 12, the control of the traveling of the vehicle 14 in the autonomous automatic driving mode is stopped by the control unit 12, and the occupant of the vehicle 14 switches from the autonomous automatic driving mode to the manual driving mode or the remote control mode.

Further, in the present embodiment, the configuration is such that when the prohibition signal is received by the prohibition signal receiving unit 40, the control of the traveling of the vehicle 14 in the autonomous automatic driving mode by the control unit 12 is prohibited. On the other hand, for example, the configuration may be such that a notification area is set outside the reception range of the prohibition signal, and when the vehicle 14 enters the notification area, the occupant of the vehicle 14 is notified that the vehicle 14 is approaching the prohibited area R and is prompted to switch the driving control of the vehicle 14 from the autonomous automatic driving mode to the manual mode or the remote control mode.

Furthermore, in the present embodiment, the configuration is such that the prohibition signal receiving unit 40 receives the prohibition signal from the prohibition signal transmission device 52, whereby the control of the traveling of the vehicle 14 in the autonomous automatic driving mode is prohibited. However, the configuration may be such that when, for example, the prohibited area R is stored in the storage device of the car navigation system 28 and the control unit of the car navigation system 28 determines that the current location of the vehicle 14 has entered the prohibited area R based on the positioning signal, the control unit 12 stops the control of the traveling of the vehicle 14 in the autonomous automatic driving mode.

Further, the prohibition signal transmitting device 52 may not be configured to be permanently installed in the specific prohibited area R. That is, the prohibition signal transmitting device 52 may be configured to be portable or transportable by a vehicle or the like, and a prohibited area R such as a festival or an event may be temporarily established during a necessary period.

What is claimed is:

1. A vehicle control device for controlling a vehicle, the vehicle control device comprising:
    a memory;
    a processor; and
    a situation detection device that detects a situation around a periphery of the vehicle and outputs a situation detection signal based on detection results, wherein
    the processor is configured (i) to receive the situation detection signal when the vehicle travels in an autonomous automatic driving mode and to control travel of the vehicle based on the situation detection signal, (ii) to receive a prohibition signal that is output from outside the vehicle as a result of the vehicle entering a reception-enabled range of a prohibited area in which the travel of the vehicle in the autonomous automatic driving mode is prohibited and to enter a prohibited state that prohibits control of the travel of the vehicle in the autonomous automatic driving mode in the prohibited area, and (iii) to use two flags to control a mode in which the vehicle travels and to reset one of the two flags when the prohibition signal is not received,
    a first one of the two flags controls whether the travel of the vehicle in the autonomous automatic driving mode is prohibited, and a second one of the two flags indicates whether an occupant of the vehicle has selected the mode in which the vehicle travels when in the prohibited state in which the travel of the vehicle in the autonomous automatic driving mode is prohibited, and
    when at a time immediately after vehicle start-up, at which time (1) the second one of the two flags indicates that the occupant has not selected the mode in which the vehicle travels when in the prohibited state, and (2) the first one of the two flags is in a reset state indicating that the prohibition signal is not received, the processor receives a selection from the occupant of (A) whether the vehicle travels in a manual mode in which the occupant of the vehicle drives the vehicle or a remote control mode in which an operator external of the vehicle drives the vehicle while in the prohibited state and (B) whether the manual mode, the remote control mode or the autonomous automatic driving mode is to be used for initial driving of the vehicle.

2. The vehicle control device of claim 1, further comprising an operation device that is provided in the vehicle, that is configured to be operated by the occupant of the vehicle, and that is configured to control the travel of the vehicle by being operated when the vehicle travels in the manual mode, which is a travel operation control mode that is different from the autonomous automatic driving mode, wherein the processor permits control of travel of the vehicle in the manual mode in the prohibited area.

3. The vehicle control device of claim 1, further comprising a remote control signal receiving unit that is configured to receive a remote control signal based on operation by the operator external to the vehicle, wherein the processor controls the travel of the vehicle based on the remote control signal received by the remote control signal receiving unit when the vehicle travels in the remote control mode, which is a travel operation control mode that is different from the autonomous automatic driving mode, and permits control of the travel of the vehicle in the remote control mode in the prohibited area.

4. The vehicle control device of claim 2, wherein the processor is configured to switch from the autonomous automatic driving mode to the manual mode as a result of the processor receiving the prohibition signal.

5. An automatic driving prohibition system, comprising:
    a prohibition signal transmission device that is installed in a prohibited area externally to a vehicle and that is configured to output a prohibition signal; and
    a vehicle control device that is provided at the vehicle, and that has a memory and a processor, the processor being configured: (i) to control travel of the vehicle in an autonomous automatic driving mode that controls the travel of the vehicle based on detection results of a situation around a periphery of the vehicle obtained by a situation detection device, (ii) to prohibit control of the travel of the vehicle in the autonomous automatic driving mode in the prohibited area as a result of receiving the prohibition signal, and (iii) to use two flags to control a mode in which the vehicle travels and to reset one of the two flags when the prohibition signal is not received, wherein
    a first one of the two flags controls whether the travel of the vehicle in the autonomous automatic driving mode is prohibited, and a second one of the two flags indicates whether an occupant of the vehicle has selected the mode in which the vehicle travels when in the prohibited state in which the travel of the vehicle in the autonomous automatic driving mode is prohibited, and
    when at a time immediately after vehicle start-up, at which time (1) the second one of the two flags indicates that the occupant has not selected the mode in which the vehicle travels when in the prohibited state, and (2) the first one of the two flags is in a reset state indicating that the prohibition signal is not received, the processor receives a selection from the occupant of (A) whether the vehicle travels in a manual mode in which the occupant of the vehicle drives the vehicle or a remote control mode in which an operator external of the vehicle drives the vehicle while in the prohibited state and (B) whether the manual mode, the remote control mode or the autonomous automatic driving mode is to be used for initial driving of the vehicle.

6. A vehicle control method for controlling a vehicle, the vehicle control method comprising:
    by a situation detection device, detecting a situation around a periphery of the vehicle and outputting a situation detection signal based on detection results; and
    by a processor, (i) controlling travel of the vehicle based on the situation detection signal when the vehicle travels in an autonomous automatic driving mode, (ii) receiving a prohibition signal that is output from outside the vehicle as a result of the vehicle entering a reception-enabled range of a prohibited area in which the travel of the vehicle in the autonomous automatic driving mode is prohibited and entering a prohibited state prohibiting control of the travel of the vehicle in the autonomous automatic driving mode in the prohibited area, and (iii) using two flags to control a mode in which the vehicle travels and resetting one of the two flags when the prohibition signal is not received, wherein
    a first one of the two flags controls whether the travel of the vehicle in the autonomous automatic driving mode is prohibited, and a second one of the two flags indicates whether an occupant of the vehicle has selected the mode in which the vehicle travels when in the prohibited state in which the travel of the vehicle in the autonomous automatic driving mode is prohibited, and when at a time immediately after vehicle start-up (1) the second one of the two flags indicates that the occupant has not selected the mode in which the vehicle travels when in the prohibited state, and (2) the first one of the two flags is in a reset state indicating that the prohibition signal is not received, the processor receives a selection from the occupant of (A) whether the vehicle travels in a manual mode in which the occupant of the vehicle drives the vehicle or a remote control mode in which an operator external of the vehicle drives the vehicle while in the prohibited state and (B) whether the manual mode, the remote control mode or the autonomous automatic driving mode is to be used for initial driving of the vehicle.

7. The vehicle control method of claim 6, further comprising, by the processor, permitting control of the travel of the vehicle in the manual mode in the prohibited area.

8. The vehicle control method of claim 6, further comprising:

by a remote control signal receiving unit, receiving a remote control signal based on operation by the operator external to the vehicle; and by the processor, controlling the travel of the vehicle based on the remote control signal received by the remote control signal receiving unit when the vehicle travels in the remote control mode, which is a travel operation control mode that is different from the autonomous automatic driving mode, and permitting control of the travel of the vehicle in the remote control mode in the prohibited area.

9. The vehicle control method of claim 7, further comprising, by the processor, switching from the autonomous automatic driving mode to the manual mode as a result of the processor receiving the prohibition signal.

* * * * *